United States Patent [19]
Cakmakci et al.

[11] Patent Number: 5,806,322
[45] Date of Patent: Sep. 15, 1998

[54] REFRIGERANT RECOVERY METHOD

[75] Inventors: Sakin R. Cakmakci, York; Walter A. Lobodinsky, Spring Grove, both of Pa.

[73] Assignee: York International, York, Pa.

[21] Appl. No.: 833,535

[22] Filed: Apr. 7, 1997

[51] Int. Cl.[6] .................................................. F25B 47/00
[52] U.S. Cl. .................................. 62/85; 62/195; 62/475; 62/231
[58] Field of Search .............................. 62/85, 195, 157, 62/149, 231, 475, 292, 303, 158

[56] References Cited

U.S. PATENT DOCUMENTS

| | | |
|---|---|---|
| 3,299,665 | 1/1967 | Rezin . |
| 3,592,017 | 7/1971 | Lipman et al. . |
| 3,620,038 | 11/1971 | Muench . |
| 4,169,356 | 10/1979 | Kingham . |
| 4,717,406 | 1/1988 | Giacobbe . |
| 4,984,431 | 1/1991 | Mount et al. . |
| 5,030,423 | 7/1991 | Obee et al. . |
| 5,062,273 | 11/1991 | Lee et al. . |
| 5,111,670 | 5/1992 | Furukawa et al. . |
| 5,161,385 | 11/1992 | Schumacher . |
| 5,209,074 | 5/1993 | McConnell et al. . |
| 5,231,980 | 8/1993 | Filipovic et al. . |
| 5,245,839 | 9/1993 | Chang et al. . |
| 5,269,155 | 12/1993 | Adelmann . |
| 5,313,805 | 5/1994 | Blackmon et al. . |
| 5,515,690 | 5/1996 | Blackmon et al. .................. 62/195 |
| 5,517,825 | 5/1996 | Manz et al. ........................ 62/195 |
| 5,605,054 | 2/1997 | Chen .................................. 62/196 |

*Primary Examiner*—John M. Sollecito
*Attorney, Agent, or Firm*—Finnegan, Henderson, Farabow, Garrett & Dunner, L.L.P.

[57] ABSTRACT

A refrigerant recovery system for use in connection with a refrigeration system having an evaporator, a compressor, and a condenser, and a purge unit connected to the condenser for receiving gaseous refrigerant and non-condensable gases from the condenser. A tank connects to the purge unit by a line for receiving purged gaseous refrigerant and purged non-condensable gases from the purge unit. The tank contains adsorbent material for recovering the purged gaseous refrigerant from the purged non-condensable gases. The system includes means for determining when a predetermined amount of purged gaseous refrigerant is received by the tank and means for controlling the flow of fluids to and from the tank.

21 Claims, 5 Drawing Sheets

REFRIGERANT RECOVERY METHOD

BACKGROUND OF THE INVENTION

1. Field of the Invention

The present invention relates to an enhanced refrigerant recovery system, and more specifically to a refrigerant recovery system in which the recovery of refrigerant gas is maximized and non-condensable contamination is minimized.

2. Discussion of the Related Art

In refrigeration systems operating at below atmospheric pressures, various non-condensable gases, including air, often leak into the system. These gases increase the pressure in the condenser, require a high power input to the compressor, and can corrode the machinery of the system. The overall effect is a decrease in the heat transfer effectiveness and performance of the refrigeration system.

Various methods and systems have been devised to remove these non-condensable gases from the refrigeration system. Generally, the non-condensables are drawn from the condenser to a purge apparatus. The purge apparatus separates refrigerant vapor from the non-condensable gases. The refrigerant vapor is then cooled and condensed by, for example, air, water, or liquid refrigerant, and returned to the system. The separated non-condensable gases are then purged to the atmosphere. However, some amount of refrigerant vapor is typically also purged to the atmosphere along with the non-condensable gases.

In order to further enhance the efficiency of removing the refrigerant from the non-condensable gases, an adsorbent material filled tank has been used. Such a tank has been connected to the outlet of the purge apparatus to receive the purged mixture of non-condensable gases and refrigerant vapor. An appropriate adsorbent material, such as granulated carbon, is within the tank and adsorbs the refrigerant vapor as non-condensable gases vent to the atmosphere. The adsorbed refrigerant vapor is then recovered from the adsorbent material and returned to the refrigeration system by, for example, a vacuum pump. A heater attached to the tank may facilitate this refrigerant recovery process by heating the tank to more quickly desorb the trapped refrigerant from the adsorbent material. In such systems, however, additional incoming non-condensable gases and refrigerant vapor flow to the carbon tank during the time that refrigerant is recovered and the adsorbent material in the tank is reactivated. In addition, without the use of a cooling mechanism, a reduction of the adsorption capability of the carbon material results, particularly at the start of an adsorption cycle.

Another refrigerant recovery system using an adsorbent material filled tank employs a tube coil within the tank. The tube coil receives a steady flow of hot pressurized gases from the refrigeration condenser. The hot gases provide continuous separation of refrigerant gases from the adsorbent material as non-condensables vent to the atmosphere. At least some of these separated refrigerant gases, however, are discharged to the atmosphere with the non-condensable gases. In addition, the temperature of the hot gases in the tube coil will vary depending on the operation of the refrigeration system. This can lower the efficiency of the regeneration of the adsorbent material.

Refrigerant recovery systems have also used an air pump connected to the adsorbent material filled tank to draw the non-condensable gases from the tank to the atmosphere. The use of an air pump, however, can lower the pressure in the tank to below atmospheric, causing some desorption of trapped refrigerant and the release of that refrigerant to the atmosphere.

SUMMARY OF THE INVENTION

An object of the invention, therefore, is to provide an improved refrigerant recovery system for use in connection with a refrigeration system. It is a further object of the invention to provide an efficient refrigerant recovery system designed to maximize the recovery of refrigerant gas to the refrigeration system and minimize non-condensable contamination. Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, the invention comprises a refrigerant recovery system for use in connection with a refrigeration system having an evaporator, a compressor, a condenser, and a purge unit connected to the condenser for receiving gaseous refrigerant and non-condensable gases from the condenser. A tank connects to the purge unit for receiving purged gaseous refrigerant and purged non-condensable gases from the purge unit. The tank contains adsorbent material for recovering the purged gaseous refrigerant from the purged non-condensable gases. The system includes sensors and a control for determining when a predetermined amount of gaseous refrigerant is received by the tank.

According to another aspect, the invention comprises a refrigerant recovery system for use in connection with a refrigerant system having an evaporator, a compressor, a condenser, and a purge unit connected to the condenser for receiving gaseous refrigerant and non-condensable gases from the condenser. A tank connects to the purge unit for receiving purged gaseous refrigerant and purged non-condensable gases from the purge unit. The tank contains adsorbent material for recovering the purged gaseous refrigerant from the purged non-condensable gases. A heater is proximate the adsorbent material to promote the desorption of the adsorbed refrigerant from the adsorbent material. Sensors and a control are operatively connected to the heater for timing the desorption of the adsorbed refrigerant.

According to a further aspect, the invention comprises a method for recovering refrigerant to a refrigeration system having an evaporator, a compressor, a condenser, and a purge unit connected to the condenser for receiving gaseous refrigerant and non-condensable gases from the condenser. The method includes the steps of supplying purged gaseous refrigerant and purged non-condensable gases from the purge unit to a tank filled with adsorbent material, determining when a predetermined amount of purged gaseous refrigerant has been supplied to the tank, adsorbing the purged gaseous refrigerant from the purged non-condensable gases by the adsorbent material, venting the purged non-condensable gases to the atmosphere from the tank, recovering the adsorbed refrigerant from the adsorbent material once the adsorbent material reaches a predetermined degree of saturation, and returning the recovered refrigerant to the evaporator.

It is to be understood that the foregoing general description and the following detailed description are exemplary and explanatory only and are not restrictive of the invention as claimed.

BRIEF DESCRIPTION OF THE DRAWINGS

The accompanying drawings are included to provide a further understanding of the invention and are incorporated

DETAILED DESCRIPTION OF THE PREFERRED EMBODIMENTS

Figure 1:
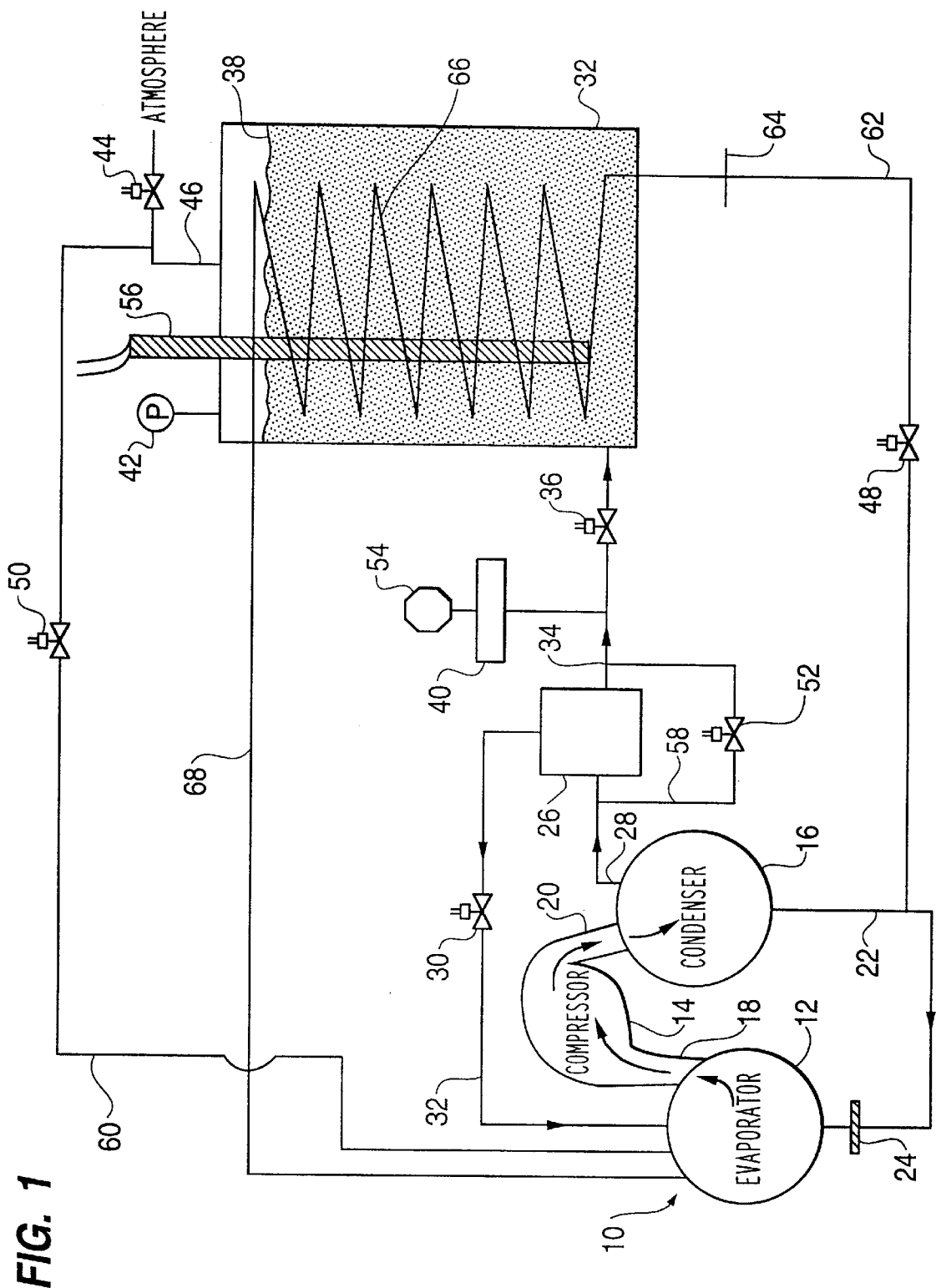
FIG. 1 is a schematic diagram showing the elements of an embodiment of the refrigerant recovery system of the present invention and showing the flow during a saturation process according to the present invention.

Reference will be made in detail to present preferred embodiments of the invention, examples of which are illustrated in the accompanying drawings. Like reference numerals refer to like parts in the various figures of the drawings.

The present invention is directed to an enhanced refrigerant recovery system. FIGS. 1–5 show the components of the refrigerant recovery system according to the present invention. The Figures individually show one phase of the refrigerant recovery process, to be described further herein. The enhanced refrigerant recovery system is for use in connection with a conventional refrigeration system and a conventional purge unit, also shown in FIGS. 1–5 and to be described further herein.

A conventional refrigeration system, generally denoted by reference numeral 10, includes an evaporator 12, a compressor 14, and a condenser 16. Evaporator 12 forms gaseous refrigerant and supplies the gaseous refrigerant to compressor 14 through a line 18. Compressor 14 pressurizes the refrigerant and supplies it to condenser 16 through a line 20. The compressed, pressurized refrigerant is cooled in condenser 16 and returned to evaporator 12 through a line 22, completing the refrigeration cycle. A conventional orifice plate or restrictor 24 located in line 22 causes a pressure drop to regulate the flow of liquid refrigerant to evaporator 12. The pressure drop creates a low pressure region in evaporator 12.

As mentioned, for refrigerant systems operating with sub-atmospheric pressures, water vapor, air and other non-condensable gases may leak into the system and accumulate in the upper portion of condenser 16 along with gaseous refrigerant. In the embodiment shown in FIGS. 1–5, a conventional purge unit 26 serves to remove some of these gases from condenser 16 and separates the gaseous refrigerant from the non-condensable gases. An exemplary, conventional purge apparatus for use in connection with the present invention is shown and described in U.S. Pat. No. 3,620,038, incorporated herein by reference.

As shown in FIG. 1 of this disclosure, a line 28 connects a purge unit 26 to the upper portion of condenser 16. Line 28 passes gaseous refrigerant, along with any water vapor, air, and other non-condensable gases, to purge unit 26. Purge unit 26 partially condenses the gaseous refrigerant to form liquid refrigerant, leaving a mixture of gaseous refrigerant, water vapor, and non-condensable gases. As the amount of condensed liquid refrigerant increases to a predetermined degree, a purge unit recovery valve 30, typically a solenoid valve or other suitable type of valve, opens to allow the liquid refrigerant to pass to evaporator 12 through a line 32. The control of valve 30 is preferably independent of the control of the enhanced refrigerant recovery system to be described herein. Valve 30 is preferably controlled according to conventional methods as in conventional purge units without the enhanced recovery system. In such conventional systems, the mixture of gaseous refrigerant, water vapor, and non-condensable gases is purged to the atmosphere.

In an ideal refrigeration system, no refrigerant is lost to the atmosphere. However, because a conventional purge unit normally does purge some gaseous refrigerant to the atmosphere, a more efficient refrigerant recovery system is desirable in which less or no refrigerant is lost to the atmosphere. Accordingly, the refrigerant recovery system according to the present invention enhances the recovery of gaseous refrigerant emitted from condenser 16 by minimizing the release of the gaseous refrigerant to the atmosphere and minimizing the non-condensable contamination returned to the refrigeration system.

The recovery system generally includes three processes to recover the gaseous refrigerant, those processes being saturation, regeneration, and cooling. Each of these processes will be described below. As will be described, the recovery system efficiently operates, and the saturation, regeneration, and cooling processes are efficiently controlled, by determining when an optimum amount of purged gaseous refrigerant has been supplied to an adsorbent material filled tank, and also by controlling the adsorption of the gaseous refrigerant in the tank, the recovery of refrigerant to the refrigeration system, and the cooling of the adsorbent material for its re-use.

Figure 2:
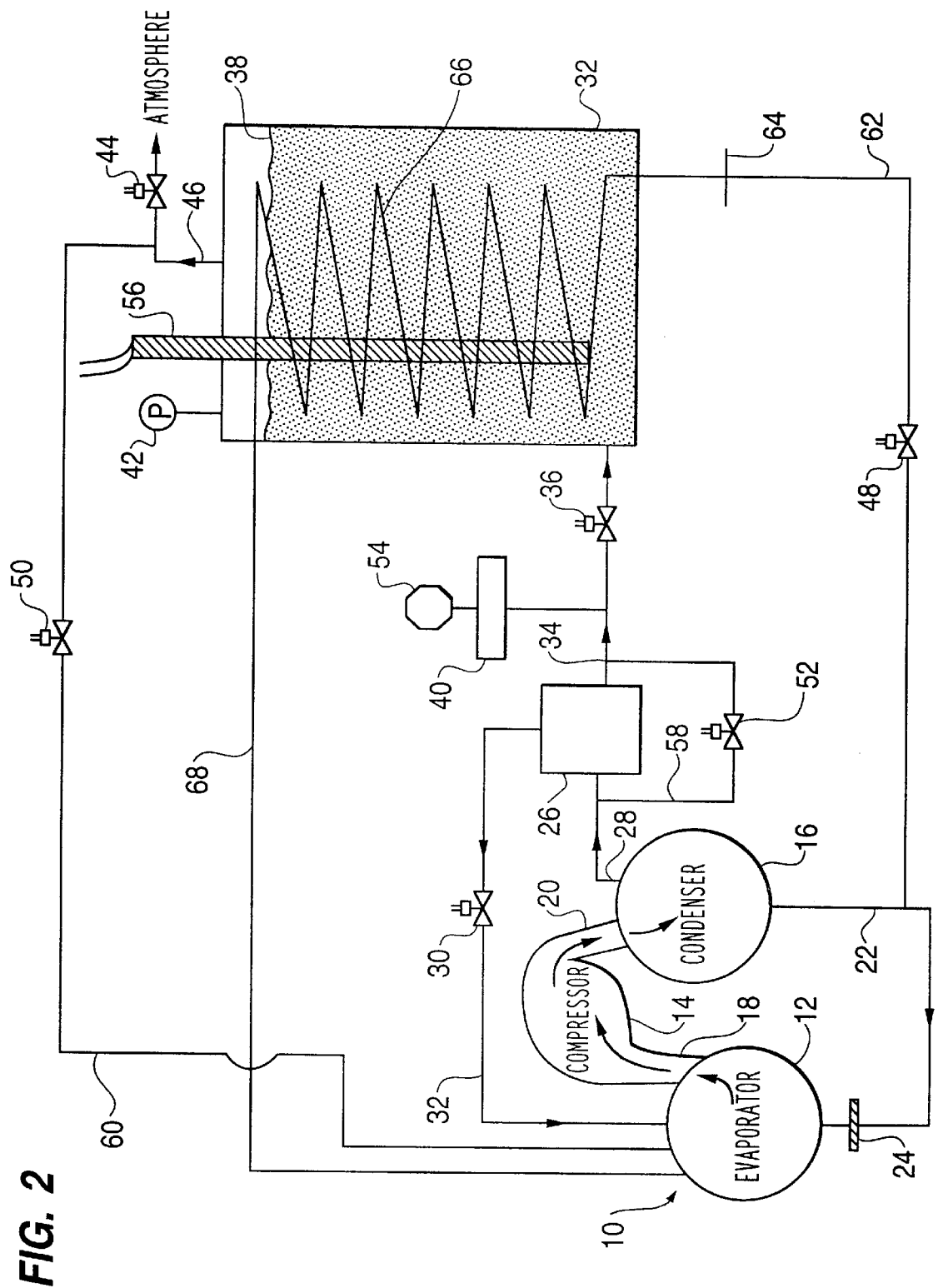
FIG. 2 is the refrigerant recovery system as in FIG. 1 showing the flow during a venting stage of the saturation process according to the present invention.

The saturation process, the first process of the refrigerant recovery system, includes two stages individually shown in FIGS. 1 and 2. In the first stage shown in FIG. 1, non-condensable gases, water vapor, and gaseous refrigerant from purge unit 26 are supplied to a tank 32 by a purging line 34. A purging control valve 36, such as a solenoid or other suitable type of valve, opens, or repeatedly opens and closes, during this stage, as will be described below, to permit the flow of these gases to tank 32. The opening and closing of valve 36 is caused by the pressure of purge unit 26.

Tank 32 contains an adsorbent material 38 for removing the gaseous refrigerant form the non-condensable gases. An organic adsorbent, such as activated carbon, for example, is a suitable adsorbent material, though other similar materials known in the art for adsorbing gaseous refrigerant may be used. Preferably, vapor phase granular activated carbon is used as the absorbent material. Another possible absorbent material is hydrophobic molecular sieve granular material.

During this first stage of the saturation process, adsorbent material 38 adsorbs the gaseous refrigerant, preferably to a saturation point. The amount of gaseous refrigerant that adsorbent material 38 can adsorb depends on the volume, type, and characteristics of adsorbent material 38.

To determine when the material 38 reaches a predetermined degree of saturation, the amount of gaseous material, including the gaseous refrigerant, supplied to tank 32 is monitored by one or more sensors or controls. One such sensor is a purge counter 40 located within line 34. In an embodiment of the invention using counter 40, control valve 36 opens when the pressure of the gaseous material in purge unit 26 increases to a predetermined first level. Control valve 36 remains open, permitting the flow of gases to tank 32, until the pressure seen by valve 36 decreases below a predetermined second level. Control valve 36 then closes. This constitutes one purge.

The predetermined pressure levels are monitored by a suitable pressure sensing device and are inherent in the purge unit. When not connected to the refrigerant recovery system, a conventional purge unit will release gaseous material to the atmosphere once the pressure in the unit builds up to a predetermined first level. The gaseous material will continue to flow into the atmosphere until the pressure in the unit drops to a predetermined second level. These pressure levels are used as the predetermined pressure levels to activate the opening and closing of valve 36 during the saturation process of the disclosed enhanced refrigerant recovery system.

Valve 36 continues to open and close during the saturation process according to the pressure in purge unit 26 until a predetermined optimum number of purges has been achieved so that the optimum amount of gaseous refrigerant is supplied to tank 32. As an example, valve 36 may open and close 25 times, constituting 25 purges, so that the optimum amount of gaseous refrigerant is supplied to tank 32. Counter 40, preferably a conventional digital counter or the like, counts the total number of purges of gaseous material from purge unit 26. The method of determining the optimum number of purges will be described herein, after the description of the remaining stages of enhanced refrigerant recovery system.

As gaseous material is supplied to tank 32 during the first stage of the saturation process, non-condensable gases fill tank 32 as gaseous refrigerant is adsorbed, raising the pressure in tank 32 to approximately atmospheric pressure. Preferably, the pressure in tank 32 is monitored so as to not go above atmospheric pressure. Otherwise, oversaturation and a decrease in the effectiveness of the absorption material occurs. The pressure within tank 32 is monitored by a pressure sensor 42 attached to tank 32.

As shown in FIG. 2, once pressure sensor 42 determines that the pressure in tank 32 has reached approximately atmospheric pressure, an air vent valve 44 is opened, permitting the non-condensable gases to vent to the atmosphere through vent line 46. This is the venting stage of the saturation process. As an example, the non-condensables may be vented to the atmosphere at the tenth purge of the 25 purges required to saturate absorbent material 38. Air vent valve 44 remains open during the remainder of the saturation process. Continuing with the same example, valve 44 remains open during the last 15 purges of the 25 total purges during the saturation process.

Under normal operating conditions, the saturation process takes a number of working days to complete. It is to be understood that this amount of time may vary depending on a variety of factors, including the characteristics of the conventional purge unit and refrigeration system to which the refrigerant recovery system is attached. In addition, abnormal conditions, for example a leak in the system, can affect the amount of time required for saturation. During the entire saturation process, a cooling valve 48, a tank recovery valve 50, and a close-loop valve 52, each to be described later, remain closed.

Figure 3:
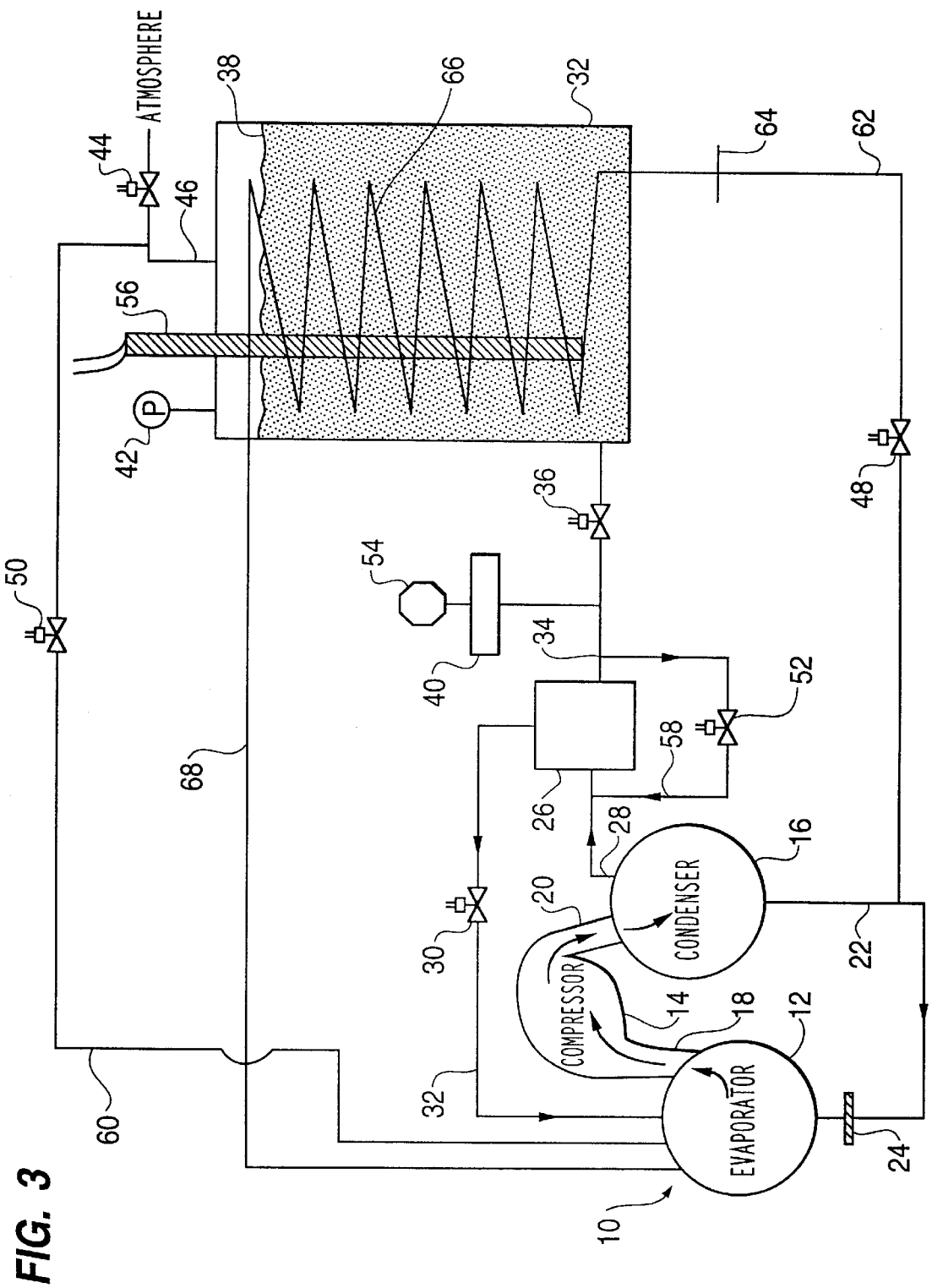
FIG. 3 is the refrigerant recovery system as in FIG. 1 showing the flow during a heating stage of the regeneration process according to the present invention.
Figure 4:
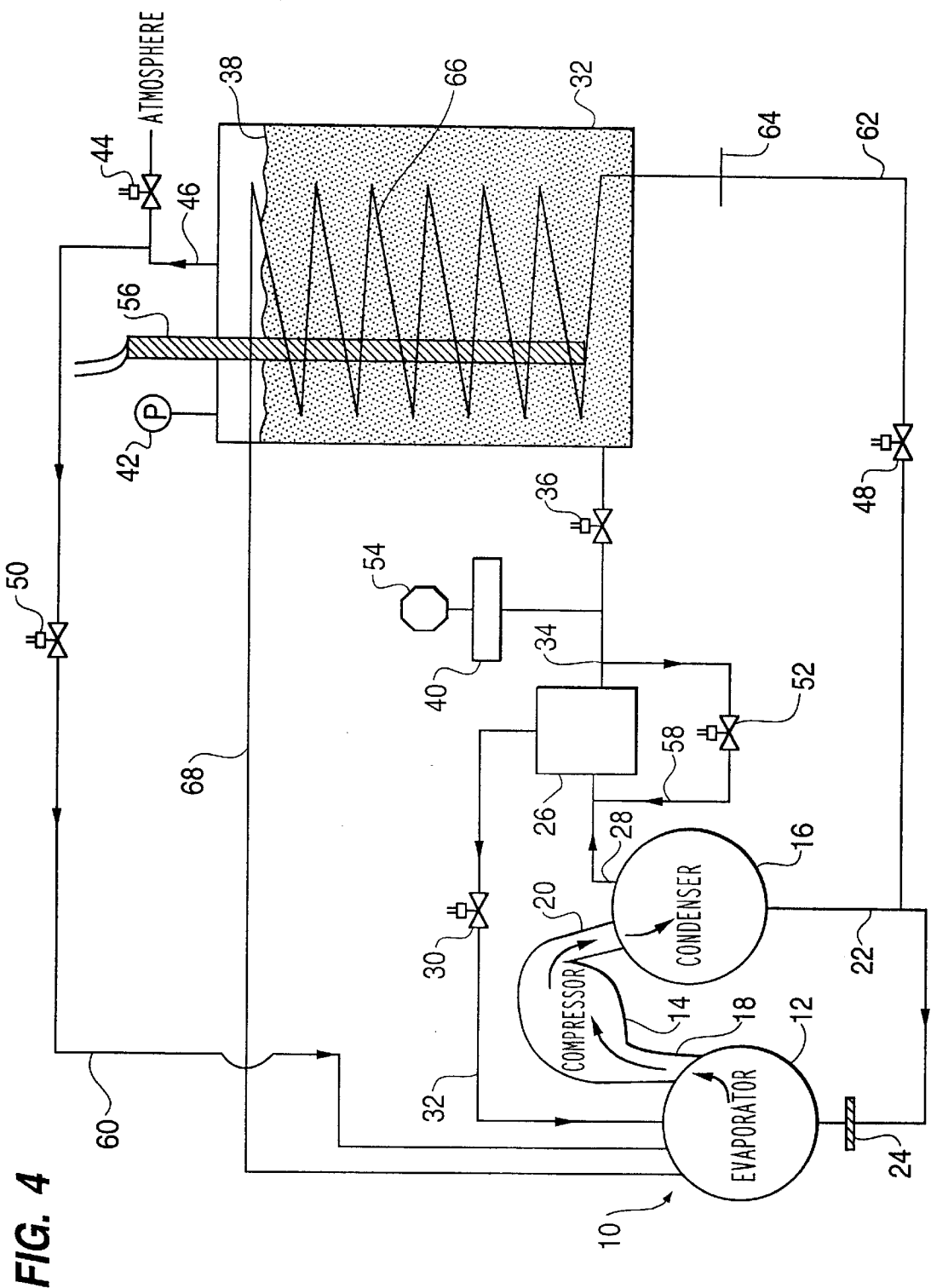
FIG. 4 is the refrigerant recovery system as in FIG. 1 showing the flow during a recovery stage of the regeneration process according to the present invention.

Once the sensors and/or controls of the present invention determine that adsorbent material 38 has been saturated to a predetermined level, i.e., counter 40 counts a predetermined optimum number of purges indicating that the optimum amount of gaseous refrigerant has been supplied to tank 32, pressure sensor 42 is deactivated (turned off), a timer 54 is set to zero and is activated, and the heating stage of the regeneration process begins. The regeneration process is shown in FIGS. 3 and 4. The purpose of the regeneration process is to desorb trapped refrigerant from adsorbent material 38 and return the refrigerant to evaporator 12. Timer 54 is preferably any conventional timing device, such as a clock for example, that counts seconds, minutes, etc. It also can be incorporated into a microprocessor. Also, at the start of the heating stage of the regeneration process, the activation of timer 54 causes purging valve 36 and air vent valve 44 to close, close-loop valve 52 to open, and heater 56 located within tank 32 to turn on. Valves 48 and 50 remain closed. Under these conditions, gaseous refrigerant, water vapor, and non-condensable gases purged from purge unit 26 do not flow to tank 32 and instead return to purge unit 26 through closed-loop valve 52 within a closed-loop line 58. This occurs during the entire regeneration process. Since most of the purging occurs prior to the regeneration process, the blockage of exhaust does not significantly affect the purging operation in an adverse way. As an alternative, solenoid valve 52 and line 58 may be open to the atmosphere to release purged gaseous material to the atmosphere during the regeneration process.

During the heating stage of the regeneration process shown in FIG. 3, heater 56 heats tank 32 so that trapped refrigerant is desorbed from adsorbent material 38. Preferably, a tubular immersion type heater is within tank 32 to heat carbon material to a temperature of approximately 200° F. Other possible heaters include hot plate radiant type heaters or flexible strip type heaters that are placed outside of tank 32.

Timer 54 times the heating stage to a predetermined optimum amount of time, for example approximately 1½ to 2 hours, to make the heating stage of the regeneration process as efficient as possible. The optimum heating time is determined from the characteristics of the system, such as the volume and type of adsorbent material and the temperature of the heater, and is predetermined in combination with the optimum number of purges, as described later. As the trapped refrigerant is desorbed, refrigerant gases will accumulate in tank 32 causing the pressure in tank 32 to rise above atmospheric pressure and above the pressure of evaporator 12, which is below atmospheric pressure.

Once timer 54 determines that the optimum, predetermined heating time has passed, heater 56 is turned off and tank recovery valve 50 located within line 60 is opened by timer 54, as shown in FIG. 4. At this point, pumping of refrigerant gas to evaporator 12 occurs through a natural pressure differential due to the high pressure in tank 32. The recovered high pressure refrigerant gas is drawn by the low pressure evaporator 12 to flow through line 60 to evaporator 12 for subsequent use in the refrigeration system. In the preferred embodiment, valve 50 is opened only after the entire desorption step is complete.

When the pressure in tank 32 is above atmospheric pressure, desorption of trapped refrigerant occurs only due to heating by heater 15. When tank recovery solenoid valve 50 is open, further desorption occurs below atmospheric pressure due also to the pressure in evaporator 12 being lower than atmospheric. Tank recovery valve 50 remains open for a short period of time as measured by timer 54. Preferably, valve 50 remains open for a few minutes, about 2–6 minutes.

Figure 5:
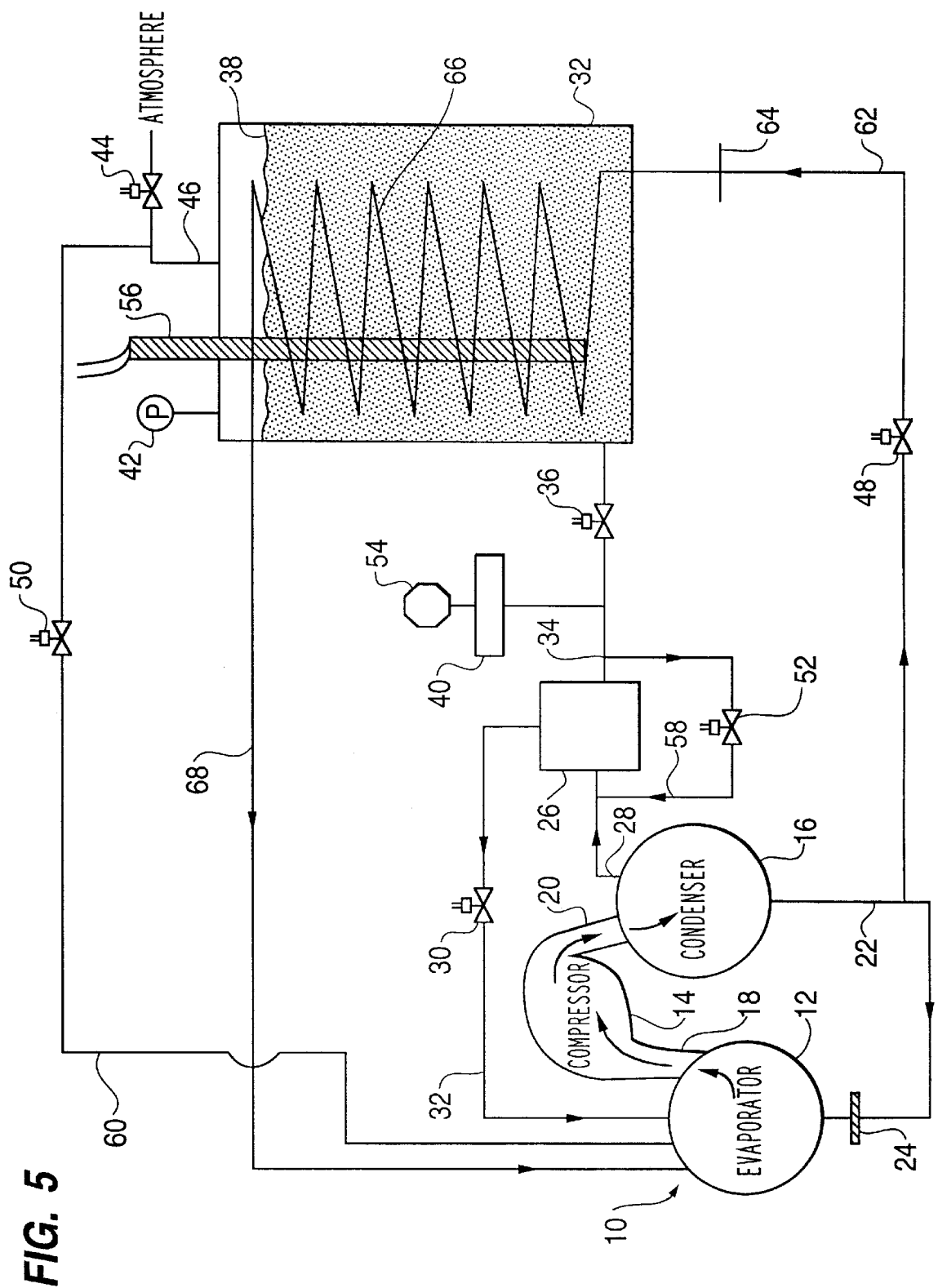
FIG. 5 is the refrigerant recovery system as in FIG. 1 showing the flow during a cooling process according to the present invention.

Valve 50 is then closed and cooling valve 48 is opened, as caused by timer 54, to begin the cooling process, the third and final process of the refrigerant recovery system. At the beginning of this process, the pressures in tank 32 and evaporator 12 are approximately equal and below atmospheric pressure. During the cooling process, cool liquid refrigerant is preferably used to cool adsorbent material 38 and thereby increase its adsorption capability prior to its re-use. During this process, valve 36 remains closed. As shown in FIG. 5, the opening of cooling valve 48 permits cool, liquid refrigerant from condenser 16 to flow through a line 62 to tank 32. Prior to entering tank 32, the liquid refrigerant passes through a cooling orifice 64, causing the liquid refrigerant to flash and maintain a surface temperature about equal to the temperature of evaporator 12. The liquid refrigerant enters and circulates through cooling coils 66 within tank 32 where it absorbs heat from adsorbent material 38. The refrigerant liquid-vapor mixture that has absorbed heat returns to evaporator 12 through a return line 68.

The temperature of adsorbent material 38 is lowered to preferably ambient temperature (about 70°–75° F.) within an optimum amount of time. This optimum cooling time is also predetermined in combination with the optimum number of purges and the optimum heating time. Timer 54 times the cooling process to increase the efficiency of the system. As an alternative, the temperature of the material can be sensed directly by a temperature sensor. The amount of time to complete the cooling process, preferably about 1 to 2 hours, depends on the type and volume of the adsorbent material, the temperature change needed for its efficient re-use, and the operating conditions of the evaporator 12. For example, the lower the temperature of the evaporator 12, the less time needed to complete the cooling process.

When the predetermined cooling time has been reached, the pressure in tank 32 is lower than the pressure of evaporator 12. At this point, timer 54 causes close-loop valve 52 and cooling valve 48 to close, purge counter 40 to reset to zero, and pressure sensor 42 to be activated. Also, at this time, purging valve 36 is caused to be opened by pressure sensor 42. The saturation process then begins anew.

The control of the saturation, regeneration, and cooling processes is performed by a control system preferably including a microprocessor electrically connected to purge counter 40, valves 36, 44, 48, 50, and 52, heater 56, timer 54 and pressure sensor 42. These components work interactively with one another through their interconnection by the microprocessor. The various measurements made throughout the processes, and by the control valves and within the flow paths, are inputted or placed in the microprocessor to control the opening and closing of the various valves, the switching on and off of the heater and pressure sensor, the flow of coolant through the heat exchanger coils, and the resetting of the timer and purge counter.

It is the combination of the number of purges and the cooling and heating times used in the system that ultimately determines the efficiency of the system and the amount of refrigerant discharged to the atmosphere. The optimum number of purges and the optimum times for heating and cooling are predetermined through an iterative trial and error method that depends on the particular refrigeration system. First, the refrigeration system is assembled for the trial and error testing. Second, the purge unit and enhanced refrigerant recovery system is connected to the refrigeration system. For purposes of the trial and error testing, as an alternative to use of the evaporator as a cooling source, any other suitable cooling source may be used, such as, for example, cold water at a temperature similar to that of the refrigerant.

Once the system has been assembled, an arbitrary number of purges is performed, and arbitrary heating and cooling times are used. The system is then allowed to run through the saturation, regeneration, and cooling processes a number of times at the arbitrary number of purges and arbitrary heating and cooling times to ensure that the adsorbent material is not fresh. A test sample of gas is then taken from tank 32 at line 46. The gas sample is taken at the end of a saturation stage, i.e. at the end of the arbitrary number of purges. The sample is then analyzed by a suitable experimental technique, for example gas chromatography, to determine the discharge ratio of refrigerant to air in the test sample. A practical and acceptable discharge ratio that results in very little release of refrigerant to the atmosphere is less than approximately 0.1 lbm refrigerant to 1 lbm air. A preferable discharge ratio is less than approximately 0.001 lbm refrigerant to 1 lbm air. The discharge ratio may be altered depending on the goal of the particular refrigeration system.

If the analyzed test sample has a discharge ratio higher than the acceptable discharge ratio, the number of purges is decreased, the heating and/or cooling times are increased, or a combination of these changes is made. A second iteration is then performed, i.e. the system is run at the newly determined number of purges and heating and cooling times. A second gas sample is taken from line 46, and a second discharge ratio is experimentally determined. This iterative process is continued until the acceptable discharge ratio is achieved, resulting in a combination of the optimum number of purges and optimum heating and cooling times to employ in the refrigerant recovery system.

It is to be understood that the resulting optimum number of purges and heating and cooling times may be relaxed somewhat. For example, the number of purges may be increased, the heating and/or cooling times may be decreased, or a combination thereof to result in a slightly higher discharge ratio. This will use less energy in the refrigerant recovery system, but can result in certain disadvantages, such as an oversaturation of the adsorbent material, a failure to desorb all of the trapped refrigerant during the regeneration process, or a failure to sufficiently increase the adsorption capability of the adsorbent material during the cooling process.

It will be apparent to those skilled in the art that various modifications and variations can be made to the enhanced refrigerant recovery system of the present invention without departing from the scope or spirit of the invention. Thus, it is intended that the present invention cover the modifications and variations of this invention provided they come within the scope of the appended claims and their equivalents.

What is claimed is:

1. A method for recovering refrigerant to a refrigeration system having an evaporator, a compressor, a condenser, and a purge unit connected to the condenser for receiving gaseous refrigerant and non-condensable gases from the condenser, the method comprising the steps of:

supplying purged gaseous refrigerant and purged non-condensable gases from the purge unit to a tank filled with adsorbent material;

adsorbing the purged gaseous refrigerant from the purged non-condensable gases by the adsorbent material;

determining when a predetermined amount of purged gaseous refrigerant has been supplied to the tank;

venting the purged non-condensable gases from the tank;

recovering the adsorbed refrigerant from the adsorbent material once the adsorbent material reaches a predetermined degree of saturation;

returning the recovered refrigerant to the evaporator; and cooling the adsorbent material, without the supply of purged gaseous refrigerant and purged non-condensable gases to the tank, to increase the adsorption capability of the adsorbent material.

2. The method of claim 1, further comprising the step of blocking the supply of purged gaseous refrigerant and purged non-condensable gases to the tank during the refrigerant recovering step.

3. The method of claim 1, wherein the refrigerant recovery step includes the step of selectively heating the adsorbent material to promote the desorption of the adsorbed refrigerant.

4. The method of claim 3, wherein the absorbent material is selectively heated for a predetermined optimum amount of time.

5. The method of claim 1, wherein the cooling step includes timing the cooling for a predetermined optimum amount of time.

6. The method of claim 1, wherein the cooling step includes cooling the adsorbent material with cool refrigerant liquid from the condenser.

7. The method of claim 1, wherein the adsorbing step includes monitoring a pressure within the tank and the venting step includes venting the purged non-condensable gases when the pressure within the tank reaches a predetermined pressure.

8. The method of claim 1, wherein the purged non-condensable gases vent from the tank when the pressure in the tank reaches a predetermined amount.

9. The method of claim 1, further comprising the step of directing the flow of purged gaseous refrigerant and purged non-condensable gases from an exit of the purge unit to an entrance of the purge unit during the cooling step.

10. A method for recovering refrigerant to a refrigeration system having an evaporator, a compressor, a condenser, and a purge unit connected to the condenser for receiving gaseous refrigerant and non-condensable gases from the condenser, the method comprising the steps of:

supplying purged gaseous refrigerant and purged non-condensable gases from the purge unit to a tank filled with adsorbent material;

adsorbing the purged gaseous refrigerant from the purged non-condensable gases by the adsorbent material;

determining when a predetermined amount of purged gaseous refrigerant has been supplied to the tank;

venting the purged non-condensable gases from the tank;

recovering the adsorbed refrigerant from the adsorbent material once the adsorbent material reaches a predetermined degree of saturation;

directing the flow of purged gaseous refrigerant and purged non-condensable gases from an exit of the purge unit to an entrance of the purge unit during the refrigerant recovering step; and returning the recovered refrigerant to the evaporator.

11. The method of claim 10, wherein the purged non-condensable gases vent from the tank when the pressure in the tank reaches a predetermined amount.

12. A method for recovering refrigerant to a refrigeration system having an evaporator, a compressor, a condenser, and a purge unit connected to the condenser for receiving gaseous refrigerant and non-condensable gases from the condenser, the method comprising the steps of:

supplying purged gaseous refrigerant and purged non-condensable gases from the purge unit to a tank filled with adsorbent material;

adsorbing the purged gaseous refrigerant from the purged non-condensable gases by the adsorbent material;

determining when a predetermined amount of purged gaseous refrigerant has been supplied to the tank;

venting the purged non-condensable gases from the tank;

recovering the adsorbed refrigerant from the adsorbent material once the adsorbent material reaches a predetermined degree of saturation;

removing the recovered refrigerant from the tank; and cooling the adsorbent material, without the venting of purged non-condensable gases from the tank, to increase the adsorption capability of the adsorbent material.

13. The method of claim 12, further comprising the step of blocking the supply of purged gaseous refrigerant and purged non-condensable gases to the tank during the refrigerant recovering step.

14. The method of claim 13, further comprising the step of directing the flow of purged gaseous refrigerant and purged non-condensable gases from an exit of the purge unit to an entrance of the purge unit during the refrigerant recovering step.

15. The method of claim 12, wherein the refrigerant recovery step includes the step of selectively heating the adsorbent material to promote the desorption of the adsorbed refrigerant.

16. The method of claim 15, wherein the absorbent material is selectively heated for a predetermined optimum amount of time.

17. The method of claim 12, wherein the cooling step includes timing the cooling for a predetermined optimum amount of time.

18. The method of claim 12, wherein the cooling step includes cooling the adsorbent material with cool refrigerant liquid from the condenser.

19. The method of claim 12, further comprising the step of directing the flow of purged gaseous refrigerant and purged non-condensable gases from an exit of the purge unit to an entrance of the purge unit during the cooling step.

20. The method of claim 12, wherein the adsorbing step includes monitoring a pressure within the tank and the venting step includes venting the purged non-condensable gases when the pressure within the tank reaches a predetermined pressure.

21. The method of claim 12, wherein the purged non-condensable gases vent from the tank when the pressure in the tank reaches a predetermined amount.

* * * * *